Sept. 29, 1959  C. L. MORSE  2,906,145
CIRCLE CUTTER
Filed Jan. 9, 1958  2 Sheets-Sheet 1
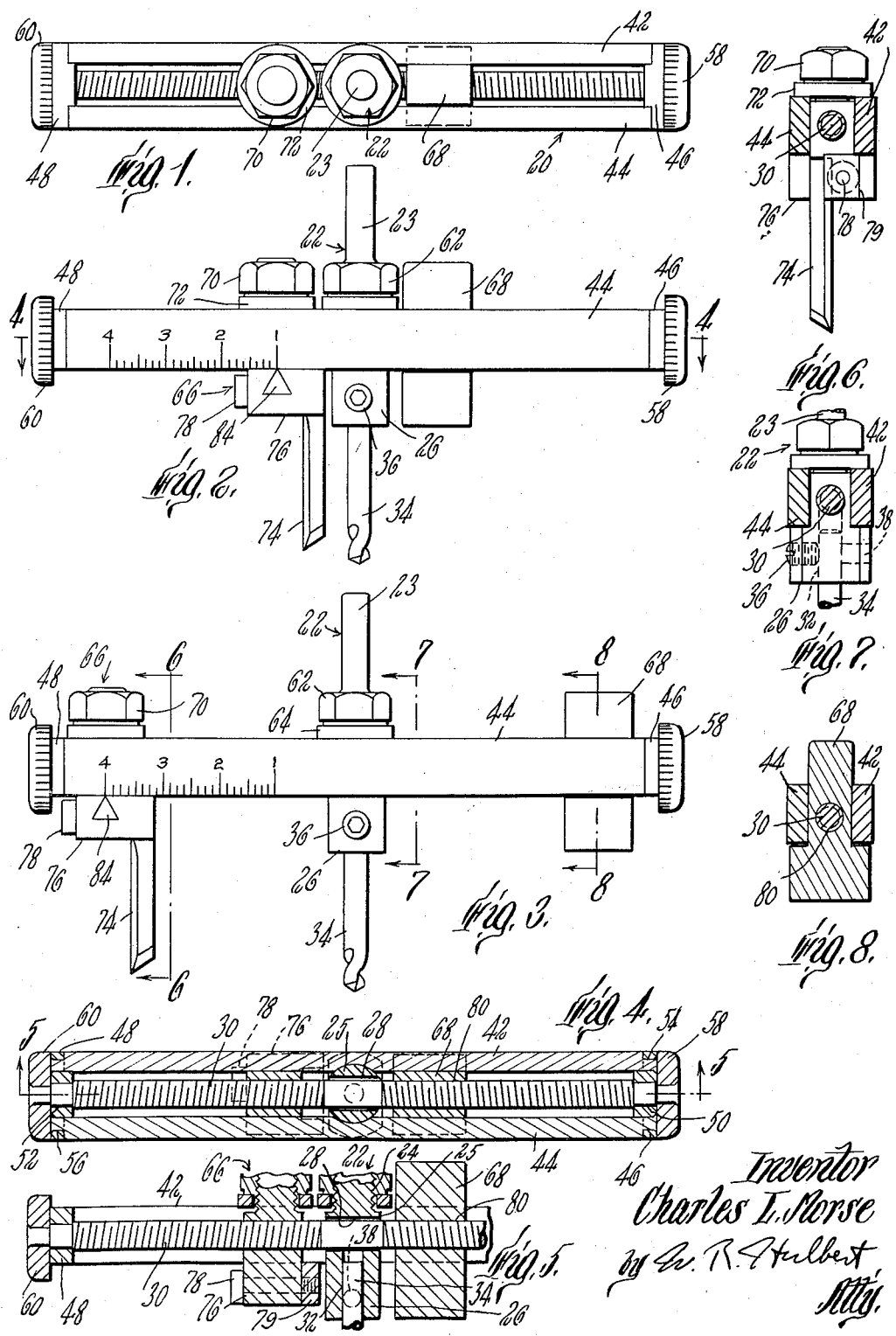
Inventor
Charles L. Morse
by G. R. Hulbert
Atty.

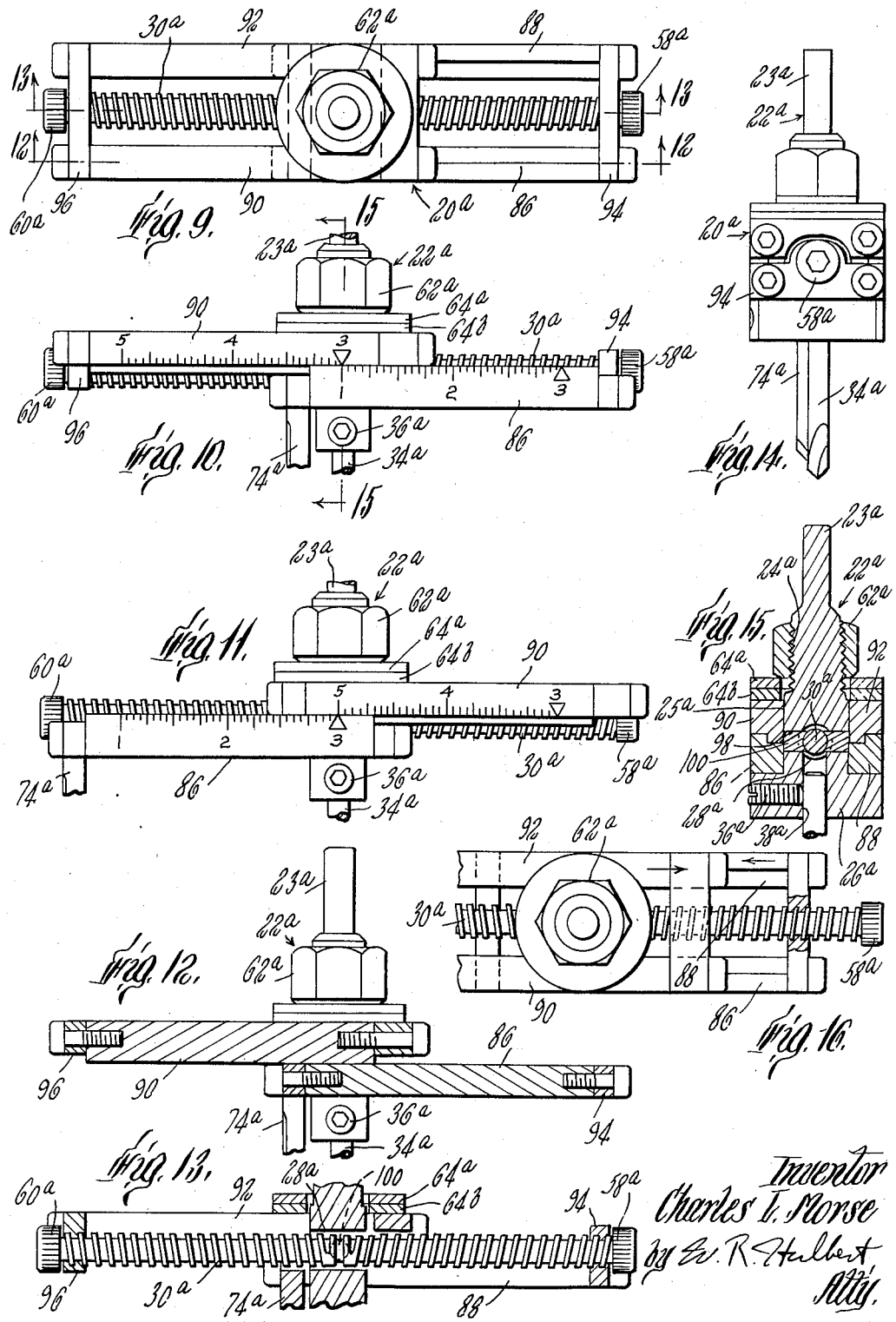

United States Patent Office 2,906,145
Patented Sept. 29, 1959

2,906,145

CIRCLE CUTTER

Charles L. Morse, South Dartmouth, Mass.

Application January 9, 1958, Serial No. 707,953

10 Claims. (Cl. 77—69)

This invention relates to attachments for machine tools and is more particularly concerned with a novel statically and dynamically balanced circle cutter for use primarily with electric drills and drill presses.

Where it is desired to cut a relatively large diameter hole using either a portable electric drill or a drill press (i.e. a hole larger in diameter than that of the ordinary drill bit), it is common practice to employ an attachment which is held by the chuck of the drill and which is expandable, capable of cutting a hole of the desired diameter. The attachment usually consists of an axially disposed centering pin or drill bit which serves to center an offset cutting bit which is spaced from the central axis and revolves around it. The cutting bit is ordinarily settable to different radii from the central axis for cutting holes of desired diameters.

Except with very slow speed drills a problem of vibration occurs, since the cutting bit comprises an off-center weight which, unless balanced, will produce undesired excessive vibration as the speed of rotation increases.

While various expedients heretofore proposed have reduced or eliminated such vibrations, none, so far as I am aware, has solved the problem in the positive and simple manner contemplated by the present invention.

Accordingly, it is an object of my invention to provide a new and improved circle cutting attachment for machine tools of the type described which is both statically and dynamically balanced and which will automatically remain so balanced through its entire range of adjustments for cutting holes of different diameters.

Another object of the invention is to provide a statically and dynamically balanced circle cutter of the type described having a scale permitting ready setting to the desired diameter of the hole to be cut.

Still a further object of the invention is to provide an adjustable circle cutter which is both statically and dynamically balanced by a counterweight and wherein adjustment to cut holes of different sizes may be accomplished by turning a single knob controlling simultaneously the positions of both the cutting bit and counterweight.

With the foregoing in mind, the invention is featured by the provision of a circle cutter for attachment to a machine tool, such as an electric drill or a drill press, having a chuck. The cutter has at one end a holding member adapted to be gripped by the chuck and on the other end mechanism for holding a centering member, such as a drill bit, on a common axis with the first-named member. A threaded shaft is rotatably mounted between these members, extends transversely of their axis and adjustably holds a cutter assembly threadedly held there on to one side of the axis and a counterweight on the other side of such axis. The cutter assembly includes a cutting bit extending in the same direction as and spaced from the centering member. The threads and the thread-engaging portions of the assembly and counterweight are arranged so that rotation of the shaft in one direction will simultaneously move the assembly and counterweight toward the center axis and rotation in the other direction will simultaneously move them away therefrom.

In one form of the invention the central shaft is mounted between a pair of fixed tracks, one of which is provided with a scale, the cutter assembly and counterweight moving on the shaft between the tracks and the cutter assembly having a pointer cooperating with the scale to show the diameter of the hole to be cut.

In another form of the invention the cutter assembly and counterweights themselves form movable tracks or slides actuated by rotation of the central shaft, the slides having mating surfaces with graduations appearing thereon to show the diameter of the hole to be cut.

Still further objects, features and advantages of the invention will become apparent from the following detailed description of presently preferred embodiments thereof taken in conjunction with the accompanying drawings in which like numerals refer to like parts in the several views and in which:

Fig. 1 is a plan view of one form of my novel circle cutter;

Fig. 2 is a front elevation of the same with the counterweight and cutting bit adjusted to cut the minimum diameter hole, in this case, as shown, one inch;

Fig. 3 is a view similar to Fig. 2 showing the cutting assembly and counterweight adjusted to their widest-apart position for cutting a hole of four-inch diameter;

Fig. 4 is a cross-sectional view taken on line 4—4 of Fig. 2;

Fig. 5 is a sectional view with portions broken away taken on line 5—5 of Fig. 4;

Fig. 6 is a view in section taken on line 6—6 of Fig. 3;

Fig. 7 is a view in section taken on line 7—7 of Fig. 3;

Fig. 8 is a view in section taken on line 8—8 of Fig. 3;

Fig. 9 is a plan view of a modified form of circle cutter in accordance with the invention;

Fig. 10 is a front elevation of the same, adjusted to cut a hole of minimum diameter;

Fig. 11 is a view similar to Fig. 10, the device being adjusted to cut a hole of maximum diameter;

Fig. 12 is a sectional view taken on line 12—12 of Fig. 9;

Fig. 13 is a sectional view taken on line 13—13 of Fig. 9;

Fig. 14 is a side elevation of the device shown in Fig. 10;

Fig. 15 is a vertical sectional view taken on line 15—15 of Fig. 10; and

Fig. 16 is a fragmentary view similar to Fig. 9 showing the relative position of the parts when the cutter assembly and counterweight are in an intermediate adjusted position, as for cutting a two-inch diameter hole.

Referring first to the embodiment of Figs. 1–8, my novel circle cutter is indicated generally by the numeral 20. It comprises central member 22 having a spindle portion 23 adapted to be gripped by the chuck of a machine tool, such as a portable electric drill or a drill press, so that the entire attachment is revolved when the tool is in operation. The member 22 at its base is provided with a threaded portion 24 beneath which are a central portion 25 and a downwardly depending enlarged portion 26 (Fig. 5). The portion 25 is provided with a transverse bore 28 adapted to receive the threaded shaft 30. The portion 26 is provided with a vertical downwardly-opening axial bore 32 for receiving the centering pin, which may be a drill bit 34. The latter is held in the bore 32 by set screw 36 threadedly engaged in a horizontal bore 38 which intersects the vertical bore 32.

A pair of spaced, parallel, transverse tracks 42, 44 is held by means of end plates 46, 48 so that they are clamped about the portion of the spindle member 22 which is located just beneath the threaded portion 24 thereof (Fig. 4). The end plates 46 and 48 are provided with apertures 50, 52 to receive the corresponding ends of the threaded shaft 30 and also with apertures 54, 56 to receive projections on the tracks 42 and 44, the ends of which are peened over as seen in Fig. 4. The outward extensions of the shaft 30 are also peened over in the countersunk portions of the central openings of the knobs 58, 60.

Thus it will be seen that the central portion 25 of the member 22 is held between the center portions of the tracks 42 and 44, which in turn are held together by the end plates 46 and 48. The threaded shaft 30 extends through the bore 28 of the portion 25, which acts as a guide or bearing to shaft 30. The spindle member 22 is then clamped firmly to the tracks 42 and 44 by hexagonal nut 62 over the washer 64. All power is transmitted from the spindle to the track through this clamped joint. Optionally, a key or shear pin can be added for a more positive drive.

Between the tracks 42 and 44 and on opposite sides of the central axis are mounted on the threaded shaft 30 respectively a cutting bit assembly indicated generally by the numeral 66 and a counterweight 68. It will be seen that the threads on the shaft 30 run in opposite directions at either end. The cutting assembly 66 and counterweight 68 are correspondingly threaded so that rotation of the shaft 30 by means of either of the knobs 58 or 60 in one direction will cause the cutter assembly and counterweight to travel toward each other, and in the other direction to cause them simultaneously to move apart. The cutting assembly is clamped at any adjusted position against the tracks 42 and 44 by means of the nut 70 over the washer 72 (Fig. 6). The lower end of the cutting assembly carries a cutting bit 74 which is mounted in the lower portion 76 of the carriage 66 by a clamping bolt 78 and a clamp 79 (Figs. 3 and 6).

The member 68 has a central aperture 80 (Fig. 8) to receive the threaded shaft 30 and its lower portion is enlarged to provide a sufficient mass to act as a counterweight.

The counterweight and cutter assemblies are so chosen as to mass and so spaced that the entire circle cutter is statically and dynamically balanced at any adjusted position of the cutter assembly. The diameter of the hole to be cut is indicated by the scale appearing on the face of the track 44 and as indicated by the marker 84 on the lower portion of the cutter carriage 66.

In the operation of the embodiment according to Figs. 1–8, the nut 70 is loosened whereupon, by rotation of either of the knobs 58 or 60, the cutter may be set to cut a hole of any desired diameter from one to four inches in the specific embodiment shown; the nut 70 is then retightened. The cutter is clamped by the spindle 23 in the jaws of the chuck of the drill press or electric drill, and upon operation of the tool, the drill bit 34 will drill a central hole in the workpiece, thus holding the device centered, as the cutting bit 74 cuts a hole of the desired diameter. Unwanted vibrations which might interfere with the operation are wholly eliminated because at any adjusted position, the attachment will remain statically and dynamically balanced.

Referring to the embodiment of Figs. 9–16, there is shown a modified form 20a of the attachment in accordance with the invention. In this embodiment I have substituted movable slides for the stationary tracks of the previously described embodiment, one set of slides constituting the carriage for holding the cutting bit and the other set of slides which is movable in opposition thereto constituting the counterweight, the principle and mode of operation remaining as before.

The pair of slides holding the cutting bit 74a is designated by the numerals 86 and 88 and the pair of slides acting jointly as a counterweight designated by the numerals 90 and 92. The slides 86, 88 are interconnected by an end plate 94 and the pair of slides 90 and 92 are interconnected by a similar end plate 96. The end plates 94 and 96 are provided with central threaded apertures receiving the threaded shaft 30a (Figs 13, 16). The spindle assembly 22a is best seen in Fig. 15. It consists of a spindle 23a having an enlarged threaded portion 24a below which is a still further enlarged portion 25a bored at 28a to receive the shaft 30a and which is also received between the pairs of slides 86, 88 and 90, 92. A still lower portion 26a beneath the portion 25a is located in part between the slides 86 and 88 and has a vertical central bore 38a which receives the drill bit 34a held by the set screw 36a. Intersecting bore 28a is a transverse bore 98 accommodating lock pins 100. The lock pins 100, as shown in Fig. 13, serve to hold the rotatable shaft 30a against endwise movement in either direction.

The slides are locked together against movement and the whole assembly rigidly held by tightening the nut 62a which threadedly engages the portion 24a of the spindle member and which has beneath it a pair of washers 64a and 64b. When the nut 62a is loosened, the pair of slides 86 and 88 may be moved simultaneously with the pair of slides 90 and 92 in opposite directions by the rotation of the shaft 30a by either of the knobs 58a or 60a. Scales appearing on the faces of the slides 86 and 90 cooperate to indicate the diameter of the hole to be cut. The masses of the respective pairs of slides, including the cutter assembly mounted to travel with the slides 86, 88, are chosen in a manner similar to the previous embodiment, such that the attachment as a whole is statically balanced and partially dynamically balanced at any cutting adjustment. For all practical purposes, it can be considered fully dynamically balanced.

The operation of this embodiment of the invention is analogous to that of the embodiment previously described. The slides are loosened by loosening the nut 62a. The operator then turns either of the knobs 58a or 60a, in turn revolving the shaft 30a which coacts with the drilled and tapped openings in the end plates 94 and 96 to move the pairs of slides simultaneously in opposite directions so as to vary the distance between the cutter bit 74a and the centering pin or drill 34a, in this case between a diameter of one inch and five inches. This embodiment enables the operator with a device of substantially the same size as the previous embodiment, to cut a hole somewhat larger in diameter.

While I have herein described and illustrated presently preferred forms of the invention, it will nevertheless be understood that the same are susceptible of numerous changes and modifications by those skilled in the art, and that the invention is intended to be limited only by the proper scope to be afforded to the appended claims.

I claim:

1. A circle cutter for attachment to a machine tool, such as an electric drill or a drill press, having a chuck, said cutter comprising, in combination, a spindle member having at one end thereof a portion adapted to be gripped by said chuck and at the other end mechanism for holding an axially disposed centering member, said spindle member having an intermediate transverse bore, a transversely extending threaded shaft passing through said bore, said shaft including threads that run in opposite directions at either end thereof, a pair of stationary tracks parallel to and embracing said threaded shaft therebetween, said tracks being held to each other at both ends by apertured end plates in which the ends of said threaded shaft are journaled, a cutter assembly threadedly held on said shaft on one side of said axis, said assembly including a cutting bit extending in the same direction as and spaced from said centering member, and a counterweight for statically and dynamically balancing said assembly threadedly held on said shaft on the other side of said axis, the thread-engaging portions of said assembly and counterweight being disposed in cooperating relationship with the threads of said shaft so that rotation of said shaft in one direction will simultaneously move said assembly and counterweight toward said axis and rotation in the other direction will simultaneously move them away from said axis.

2. The combination as claimed in claim 1 including a clamping device on said cutter assembly for clamping the same to said tracks in an adjusted position.

3. The combination as claimed in claim 2 including a knob mounted on an end of said shaft to permit manipulation of the latter.

4. The combination as claimed in claim 3 wherein one of said tracks is provided with a scale and said cutter assembly is provided with a marker cooperating with said scale to indicate the diameter of the circle to be cut.

5. A circle cutter for attachment to a machine tool, such as an electric drill or a drill press, having a chuck, said cutter comprising, in combination, a spindle member having at one end thereof a portion adapted to be gripped by said chuck and at the other end mechanism for holding an axially disposed centering member, said spindle member having an intermediate transverse bore, a transversely extending threaded shaft passing through said bore, said shaft including threads that run in opposite directions at either end thereof, two pairs of spaced tracks parallel to each other and to said shaft, corresponding tracks of each pair being in sliding engagement with corresponding tracks of the other pair, one of said pairs being movably mounted by threaded mountings on one end portion of said shaft and the other of said pairs being movably mounted by threaded mountings on the other end portion of said shaft, a cutter assembly having a cutting bit extending in the same direction as and spaced from said centering member mounted on one of said pairs of tracks and a counterweight for fully statically and for at least substantially dynamically balancing said assembly mounted on the other of said pairs of tracks, and the thread-engaging portions of said track mountings being disposed in cooperating relationship with the threads of said shaft so that rotation of said shaft in one direction will produce relative motion of said pairs of tracks in a first direction and rotation in the other direction will cause relative motion thereof in a second direction, whereby said cutter assembly and said counterweight are moved simultaneously toward and away from each other by operation of said shaft.

6. The combination as claimed in claim 5 including a clamping device for said pair of tracks operating to clamp one pair to the other pair in an adjusted position.

7. The combination as claimed in claim 6 including a knob mounted on an end of said shaft to permit manipulation of the latter.

8. The combination as claimed in claim 7 wherein corresponding mutually engaging tracks, one of each pair, are provided with cooperating scales to indicate the cutting diameter.

9. A circle cutter for attachment to a machine tool, such as an electric drill or a drill press, having a chuck, said cutter comprising, in combination, a spindle member having at one end thereof a portion adapted to be gripped by said chuck and at the other end mechanism for holding an axially disposed centering member, said spindle member having an intermediate transverse bore, a transversely extending rotatable threaded shaft passing through said bore, said shaft including thread portions that run in opposite directions, a cutter assembly having a cutting bit extending in the same direction as and spaced from the axis of said centering member, and a counterweight for statically and for at least substantially dynamically balancing said assembly, said counterweight being positioned on the other side of said axis from said cutter assembly, means for adjusting the cutting radius of said cutter including thread engaging portions associated with said cutter assembly and said counterweight and arranged to cooperate with the thread portions of said shaft so that the rotation of said shaft in one direction will simultaneously move said cutter assembly and said counterweight toward said axis and rotation of said shaft in the other direction will simultaneously move them away from said axis, and a single locking means adapted to secure both said counterweight and said cutter assembly in position relative to said axis.

10. The cutter as claimed in claim 9 and further including a pair of spaced tracks parallel to each other and embracing said threaded shaft therebetween, said cutter assembly and said counterweight being mounted such that they are adapted to move relative to at least one of said tracks and said locking means being adapted to cooperate with at least one of said tracks in a clamping action.

References Cited in the file of this patent

UNITED STATES PATENTS

| | | |
|---|---|---|
| 733,821 | Dixon | July 14, 1903 |
| 2,556,240 | Valentine et al. | June 12, 1951 |

FOREIGN PATENTS

| | | |
|---|---|---|
| 142,597 | Switzerland | Oct. 20, 1953 |

UNITED STATES PATENT OFFICE
CERTIFICATE OF CORRECTION

Patent No. 2,906,145 September 29, 1959

Charles L. Morse

It is hereby certified that error appears in the printed specification of the above numbered patent requiring correction and that the said Letters Patent should read as corrected below.

Column 6, line 50, list of references cited under "FOREIGN PATENTS", for 142,597    Switzerland ----- Oct. 20, 1953 read 142,597    Sweden ---------- Oct. 20, 1953

Signed and sealed this 29th day of March 1960.

(SEAL)
Attest:

KARL H. AXLINE
Attesting Officer

ROBERT C. WATSON
Commissioner of Patents